9656X
N. Russel.
Cooking Stove.
Patented May 14, 1836.
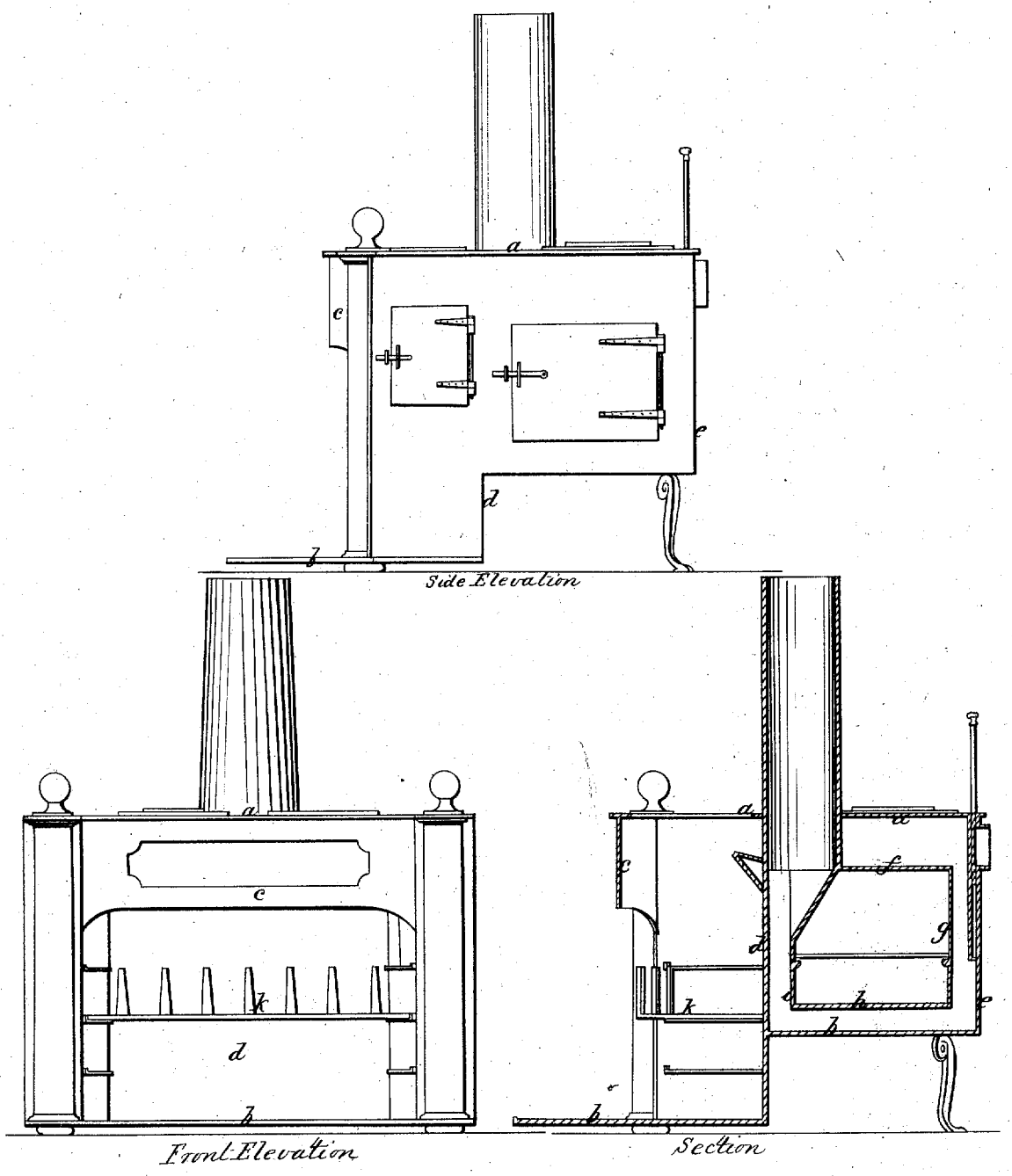

9656X

May 14, 1836

Nathaniel Russell, of Waterville State of Maine.

Letters Patent.

The schedule referred to in these Letters Patent and making part of the same containing a description in the words of the said Nathaniel Russell himself of his improvement in Cooking Stoves —

To all to whom these presents shall come.
Be it known that I Nathaniel Russell of Waterville in the County of Kennebec & State of Maine, have invented a new and useful improvement in "Cooking Stoves" which has not been heretofore used or known, and that the following is a full and exact description of the construction and operation thereof, that is to say — For the combination of my Stove, I use the shape of the common Franklin, as presenting also the advantage of the open fire place, and adapt to it a grate for the purpose of burning either coal or wood; which grate is made moveable by the addition of suitable projections or flanges from the jambs in order to raise the fire towards the top of the Franklin & nearer the vessels at such times as less heat is desirable. At the back, I extend the top and side plates to any desirable size, and support the bottom plate by proper legs, somewhat above the hearth plate of the Franklin; & the addition of the back forms an enclosure, intended to receive the oven, which is constructed of four plates, connected by their ends to the sides of the enclosure where the doors to the oven are formed, but the top, bottom, and sides of it are supported at such a space from, or inside of those of the enclosure as to form a draught or current for the heat which enters the throat of the Franklin to circulate around the four sides. And this circulation I cause to terminate in a pipe in the centre of the top plate of the stove, by the following arrangement viz. the top plate of the oven I join to the back of the Franklin, just where the incline plates at the throat, are placed, which of course cuts off the draught from continuing near its termination, over the top of the oven; and in about the centre of this junction & on a suitable part of the top plate of the oven, I make, an opening and around it cast a flange, which is to rise up high enough to pass through the top plate of the stove, & then receive the smoke pipe which is to

9656X

May 14, 1836 fit on it, This opening and flange I generally prefer of an oval shape as most suitable, & the adjoining side of the oven must be so curved, to suit the oval, as to give every facility to the passage of the heat and smoke, after it has thus performed its current entirely around the oven, .

This Method of conducting the draught so as to give the first application of heat to the top of the oven, where the strongest is required, and thence gradually diminishing in temperature as it passes the bottom, and up the remaining side to escape by the smoke pipe, preserves so uniform & desirable a temperature to the contents thereof, as will be found highly beneficial. But should it be desired to let the draught simply pass over the top of the oven, without descending to pass round the other sides - then I make an opening in the back plate of the enclosure, near the top, of about the width and length of the space between the top of the oven, & the top of the enclosure, to which I adapt a sliding damper to be raised by means of an upright rod through the top plate, having notches on one edge to catch in the plate so that the damper may be used to close the aperture entirely, when the whole draught around the oven, is required or may be let down & opened to such extent only, as may be wished, the whole opening allowing the draught to pass over the top of the oven only, & out of the opening into the chimney. The top plate of the Franklin and also that of the enclosure is perforated as usual for the admission of vessels for cooking. The interior of the oven has a rack or support for the articles to be baked; and to the front of the Franklin, I adapt a sheet iron blower, or fender, having a draught hole at the bottom, this will be moveable and used as occasion may require.

A door is also to be made in the jamb of the Franklin in order to introduce fuel, when ever the grate is raised so high as to be above the front plate thereof. What I claim as my invention and what I wish to secure by Letters Patent, is the arrangement of the flues, damper, & smoke pipe, by which the draught can be made to circulate as above described - I do not wish to be understood, as confining myself to the precise form of this arrange-ment, but to vary the same, in any way, whilst I retain the same general features - In testimony that the above is a full description of my improvement as invented by me I have hereunto set my hand this fifteenth day of April 18[illegible]

Witnesses { Henry Stone }
{ Jacob S. Robbins }

Nathl. Russell